United States Patent
Seffernick et al.

[11] Patent Number: 5,880,571
[45] Date of Patent: Mar. 9, 1999

[54] METHOD OF AND SYSTEM FOR CONTROLLING A VARIABLE SPEED INDUCTION MOTOR

[75] Inventors: George H. Seffernick; Mahesh J. Shah, both of Rockford, Ill.

[73] Assignee: Sundstrand Corporation, Rockford, Ill.

[21] Appl. No.: 927,852

[22] Filed: Sep. 11, 1997

[51] Int. Cl.$^6$ .................................................. H02P 1/38
[52] U.S. Cl. .................................... 318/773; 318/524
[58] Field of Search .................... 318/773–777, 318/152–154, 496, 498, 523, 524; 307/129, 87; 361/182; 363/142, 143

[56] References Cited

U.S. PATENT DOCUMENTS

| | | | |
|---|---|---|---|
| 3,865,209 | 2/1975 | Aihara et al. | 180/65.4 |
| 4,467,257 | 8/1984 | Douthart et al. | 318/774 |
| 4,488,100 | 12/1984 | Fujii et al. | 318/798 |
| 4,784,580 | 11/1988 | Takata et al. | 417/295 |
| 5,614,799 | 3/1997 | Anderson et al. | 318/439 |
| 5,650,707 | 7/1997 | Lipo et al. | 318/773 |

*Primary Examiner*—Brian Sircus
*Attorney, Agent, or Firm*—Marshall, O'Toole, Gerstein, Murray & Borun

[57] ABSTRACT

A method of and system for controlling an induction motor detects input frequency to the motor and connects windings of the motor in one of a plurality of configurations in dependence upon the detected frequency.

8 Claims, 5 Drawing Sheets

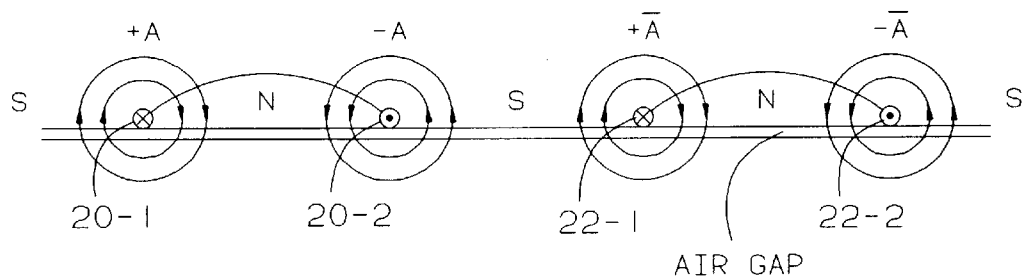
FIG.2
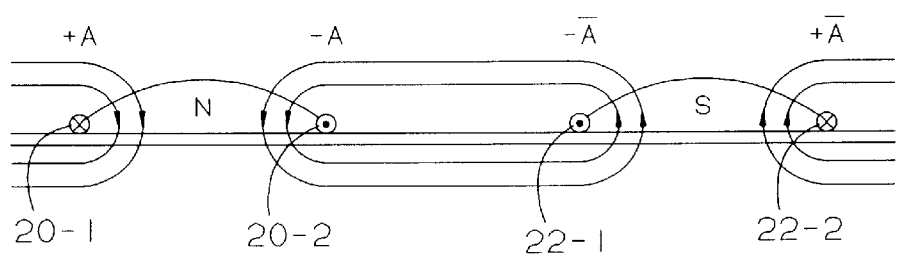
FIG.3
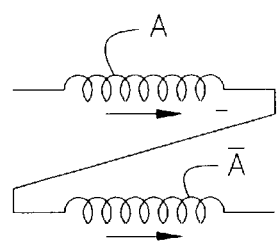   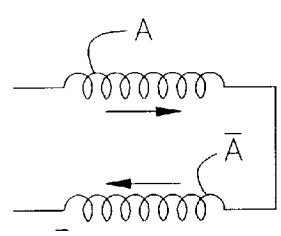
FIG.4a                FIG.4b

METHOD OF AND SYSTEM FOR CONTROLLING A VARIABLE SPEED INDUCTION MOTOR

TECHNICAL FIELD

The present invention relates generally to motor controls, and more particularly to a method of and system for controlling a variable speed induction motor to improve the efficiency thereof.

BACKGROUND ART

Often, variable speed induction motors are used to supply motive power to one or more loads, for example, on an aircraft. Also, frequently, these motors receive variable frequency power and thus drive the loads at a variable speed. When the load comprises a pump, fan or other load, high fluid friction losses are typically encountered at high motor speeds, thereby leading to an undesired decrease in efficiency. While the motor speed could be controlled over an input frequency range to limit losses, such an approach is typically implemented through the use of a power electronics based motor drive, which can be an expensive and complex circuit requiring cooling and which undesirably adds to the size and weight of the aircraft power system.

SUMMARY OF THE INVENTION

A method of and control for an induction motor adjusts the speed of the motor based upon input frequency without the need for a power electronics based drive.

More particularly, in accordance with one aspect of the present invention, a method of controlling an induction motor having windings which receive power from a variable frequency power source includes the steps of detecting the frequency of the power from the variable frequency power source and connecting the windings in one of two or more pole configurations depending upon the detected frequency.

Preferably, the step of connecting comprises the step of configuring the windings in a low-pole configuration while the detected frequency is below a certain frequency and configuring the windings in a high-pole configuration while the detected frequency is above the certain frequency. Still further in accordance with the preferred embodiment, the step of connecting includes the step of operating a breaker.

In accordance with another aspect of the present invention, apparatus for controlling an induction motor having windings which receive power from a variable frequency power source includes means for detecting the frequency of the power from the variable frequency power source and means for connecting the windings in one of at least two-pole configurations in dependence upon the detected frequency.

Other features and advantages will become apparent from the specification and drawings of the present application, in which like reference numerals denote like structures.

BRIEF DESCRIPTION OF THE DRAWINGS

FIG. 2 comprises a simplified winding diagram of one phase of a four-pole winding configuration for the induction motor/pump during operation above a certain input frequency;

FIG. 3 comprises a simplified winding diagram of one phase of a two-pole winding configuration for the induction motor/pump during operation below a certain input frequency;

FIGS. 4a and 4b comprise simplified schematic diagrams illustrating possible interconnections of the phase windings in the four-pole and two-pole configurations of FIGS. 2 and 3, respectively;

DESCRIPTION OF THE PREFERRED EMBODIMENTS

Figure 1:
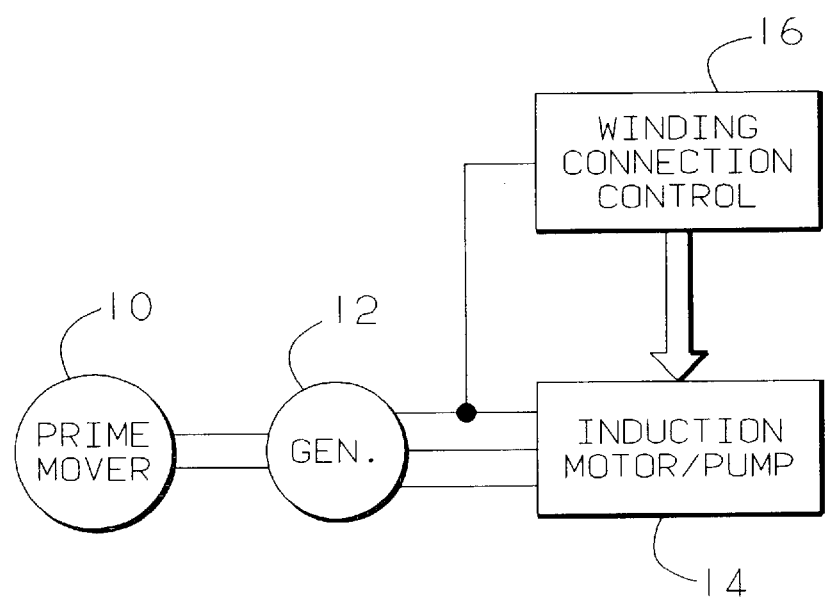
FIG. 1 comprises a block diagram of a combined induction motor/pump together with a prime mover and a generator.

Referring now to FIG. 1, a prime mover 10 which may comprise, for example, a jet engine of an aircraft, develops motive power for a generator 12, which in turn generates electrical power for an induction motor/pump combination 14. The induction motor/pump combination 14 may comprise an induction motor and a fluid pump contained in a unitary housing. In the illustrated embodiment, the prime mover 10 is directly coupled to and drives the generator 12 at a variable speed such that the generator develops variable frequency power. Because the induction motor of the combination 14 is similar to a synchronous machine, the speed of operation of the motor is proportional to the frequency developed by the generator 12. Inasmuch as the output frequency of the generator 12 can vary over a wide frequency range, the speed of operation of the motor/pump combination can likewise vary greatly. At higher operating speeds, the motor/pump combination can experience high fluid friction losses leading to an undesirable decrease in efficiency.

In order to overcome the foregoing difficulty, the present invention allows motor speed to be decreased at high supply frequencies to improve overall system efficiency without the use of a power electronics based motor drive. To that end, a winding connection control 16 is responsive to the frequency of the power developed by the generator 12 and connects the windings of the induction motor of the combination 14 in one of a plurality of winding configurations based upon such detected frequency.

Figure 8:
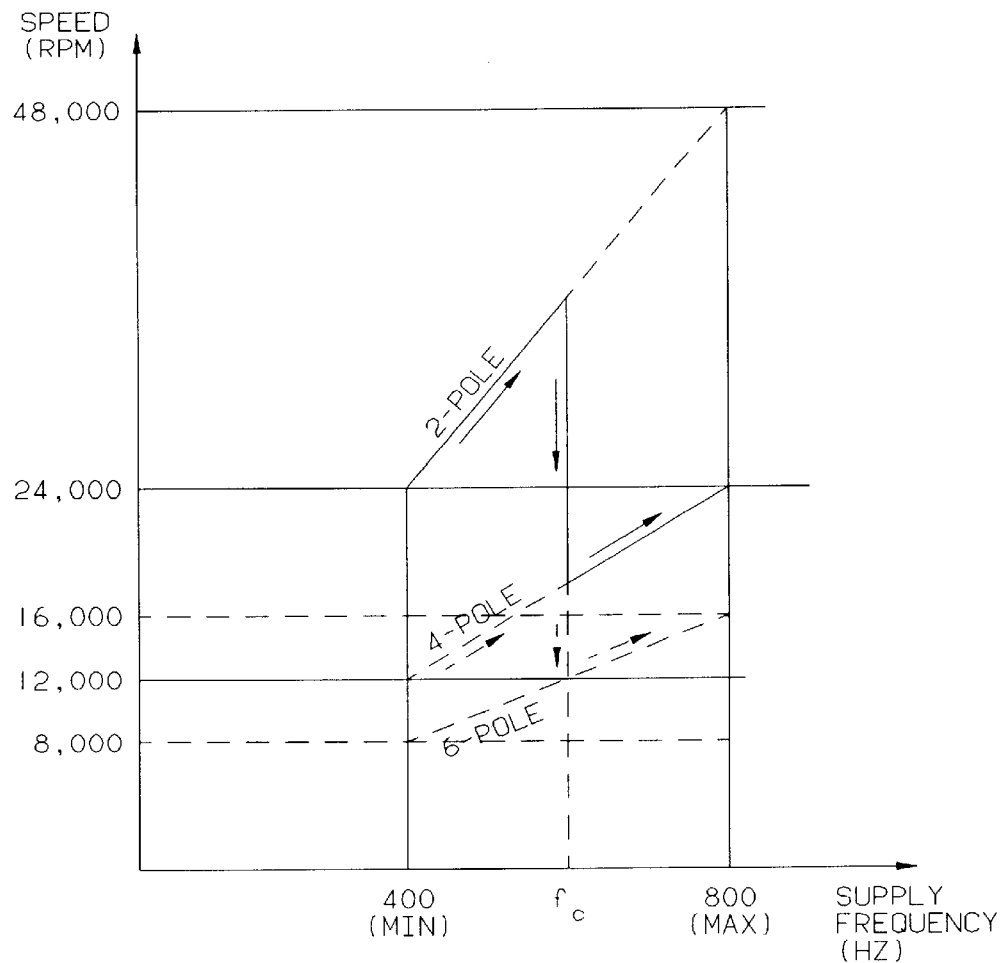
FIG. 8 is a graph illustrating the reconnection of windings as a function of supply frequency according to the present invention.

FIGS. 2 and 3 illustrate simplified winding diagrams while FIGS. 4a and 4b schematically illustrate the connections of the windings of FIGS. 2 and 3 respectively. It should be noted that only windings of a single phase (phase A) are shown in FIGS. 2, 3, 4a and 4b for simplicity. FIG. 2 illustrates a possible four-pole winding configuration comprising winding portions 20-1, 20-2, 22-1, and 22-2. (In FIGS. 2 and 3 a cross in a circle indicates winding portions where current is traveling in a first direction whereas a circle with a dot indicates winding portions with current flowing in a second direction opposite the first direction). As seen in FIG. 4a, a winding A comprising winding portions 20-1 and 20-2 is connected in series with a winding $\overline{A}$ comprising the winding portions 22-1, 22-2 to form the four-pole configuration of FIG. 2. By reversing the currents in the winding portions 22-1, 22-2 relative to the current directions of FIG. 2, the two-pole configuration of FIG. 3 results. The winding connections are schematically illustrated in FIG. 4b as a parallel connection of windings A and $\overline{A}$. Recognizing that the speed of an induction motor is determined by the input frequency and the number of poles of the machine, the present invention connects the windings in a low-pole (e.g., two-pole) configuration for supply frequencies below a certain frequency, and connects the windings in a highpole (e.g., four-pole) configuration at input frequencies above the certain frequency. This operation is illustrated in FIG. 8 illustrating an example of input frequencies varying over a 2-1 frequency range (between 400 and 800 hertz). Below a certain frequency $f_c$ intermediate the minimum and maximum frequencies, the motor of the combination 14 is connected in a two-pole configuration so that speed varies in a range above 24,000 RPM. When the generator frequency exceeds $f_c$, the motor of the combination 14 is connected in the four-pole configuration so that speed varies in a range below 24,000 RPM. The particular frequency selected as the changeover frequency $f_c$, may be selected depending upon the particular application and to keep total efficiency over the frequency range at or below a particular level.

Figure 7:
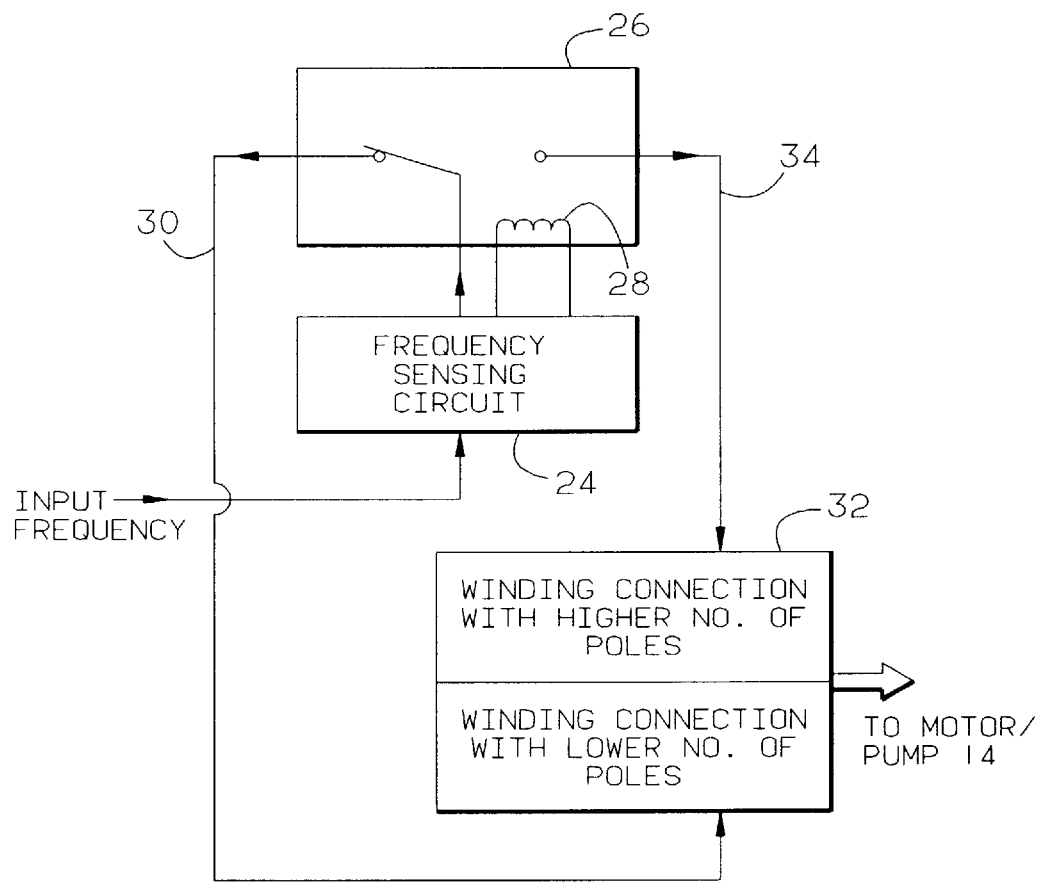
FIG. 7 is a block diagram of circuitry for reconnecting windings according to the present invention.

FIG. 7 illustrates a preferred embodiment of the winding connection control 16. The output frequency of the generator 12 is detected by a frequency sensing circuit 24 which is coupled to a motor breaker 26 having one or more contacts or switches which are operated in response to the state of energization of a control coil 28. When the frequency sensing circuit 24 detects that the frequency of the generator 12 is below $f_c$, the control coil 28 is unenergized, causing a s al to be developed by the frequency sensing circuit 24 on a line 30, thereby causing a switching circuit 32 to connect the windings of the motor of the combination 14 in the two-pole configuration. when the frequency of the generator 12 is above $f_c$, the control coil 28 is energized, thereby causing the frequency sensing circuit 24 to be connected to a line 34. The circuit 24 develops a signal which is supplied over the line 34 to a switching circuit 32 to cause the windings of the motor of the combination 14 to be connected in the four-pole configuration. The circuits 24, 26, and 32 can be readily devised given the disclosure herein by one of ordinary skill in the art.

Figure 5A:
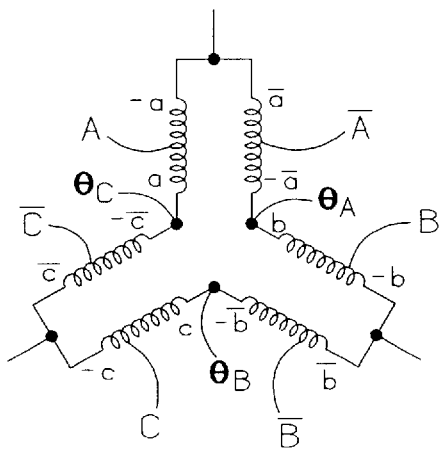
FIGS. 5a and 5b illustrate low speed and high speed connections, respectively, for series-connected machine windings.
Figure 5B:
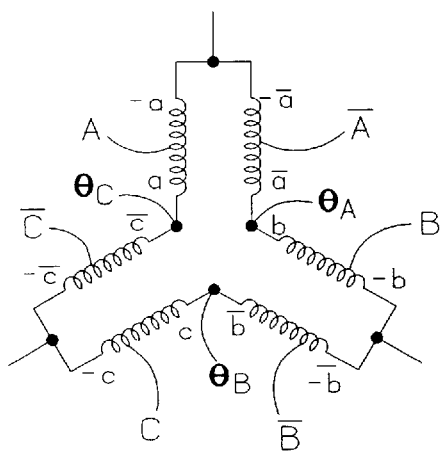

FIGS. 5a and 5b illustrate alternative low frequency (i.e., below $f_c$) and high frequency (i.e., above $f_c$) winding configurations for series-connected machine windings of the induction motor in accordance with the present invention. As seen by comparing FIGS. 5a and 5b, the connections at the ends a and -a of the winding $\overline{A}$ are reversed in the low frequency (i.e., high-pole) and high frequency (i.e., low-pole) configurations. In like fashion, the connections to ends of windings $\overline{B}$ and $\overline{C}$ are likewise reversed between low and high frequency winding configurations.

Figure 6A:
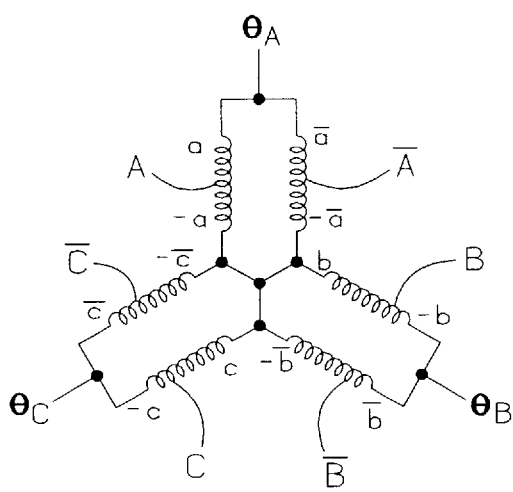
FIGS. 6a and 6b illustrate low speed and high speed connections, respectively, for parallel-connected machine windings.
Figure 6B:
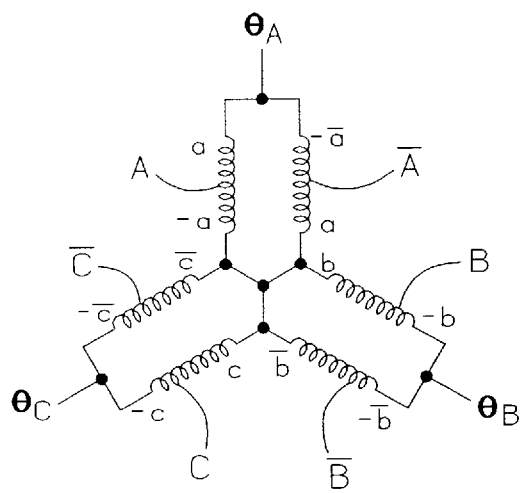

FIGS. 6a and 6b illustrate parallel connections of three-phase windings. As in the embodiment of FIGS. 5a and 5b, and in accordance with the present invention, the connections to ends of windings $\overline{A}$, $\overline{B}$ and $\overline{C}$ are reversed in low and high frequency winding configurations.

Referring again to FIG. 8, if desired, the control can switch between winding configurations other than the two-pole and four-pole configurations described above. Thus, for example, the control may switch between four-pole and six-pole configurations at fee as illustrated by the dashed lines of FIG. 8. Further, the control can switch among a number of winding configuration greater than two configurations at multiple changeover frequencies, if desired. For example, the control may switch between two-pole and four-pole configurations at a first changeover frequency $f_{c1}$ and further may switch between four-pole and six-pole configurations at a second changeover frequency $f_{c2}$. Any other combinations of winding configurations and changeover frequencies may be implemented and still be within the scope of the present invention.

Other winding configurations can be envisioned, as should be evident to one of ordinary skill in the art.

While the preferred embodiment has been disclosed in connection with the combined induction motor/pump, it should be understood that the present invention is applicable to the control of any induction motor, whether or not such motor is utilized to drive a load (such as a pump) located in a unitary housing with the motor.

Numerous modifications and alternative embodiments of the present invention will be apparent to those skilled in the art in view of the foregoing description. Accordingly, this description is to be construed as illustrative only and is for the purpose teaching those skilled in the art the best mode of carrying out the invention. The details of the structure and/or function may be varied substantially without departing from the spirit of the invention, and the exclusive use of all modifications which come within the scope of the appended claims is reserved.

We claim:

1. A method of controlling an induction motor having windings which receive power from a variable frequency power source, the method comprising the steps of:

detecting the frequency of the power from the variable frequency power source; and connecting the windings in one of at least two-pole configurations in dependence upon the detected frequency.

2. The method of claim 1, wherein the step of connecting comprises the steps of configuring the windings in a low-pole configuration while the detected frequency is below a certain frequency and configuring the windings in a high-pole configuration while the detected frequency is above the certain frequency.

3. The method of claim 1, wherein the step of connecting comprises the steps of configuring the windings in a two-pole configuration while the detected frequency is below a certain frequency and configuring the windings in a four-pole configuration while the detected frequency is above the certain frequency.

4. The method of claim 1, wherein the step of connecting includes the step of operating a breaker.

5. Apparatus for controlling an induction motor having windings which receive power from a variable frequency power source, comprising:

means for detecting the frequency of the power from the variable frequency power source; and means coupled to the detecting means for connecting the windings in one of at least two-pole configurations in dependence upon the detected frequency.

6. The apparatus of claim 5, wherein the connecting means comprises means for configuring the windings in a low-pole configuration while the detected frequency is below a certain frequency and configuring the windings in a high-pole configuration while the detected frequency is above the certain frequency.

7. The apparatus of claim 5, wherein the connecting means comprises means for configuring the windings in a two-pole configuration while the detected frequency is below a certain frequency and configuring the windings in a four-pole configuration while the detected frequency is above the certain frequency.

8. The apparatus of claim 5, wherein the connecting means comprises a controllable breaker.

* * * * *